(12) United States Patent
Inschlag et al.

(10) Patent No.: US 9,923,498 B2
(45) Date of Patent: Mar. 20, 2018

(54) METHOD FOR OPERATING AN ELECTRIC MOTOR (71) Applicant: OTTO BOCK HEALTHCARE PRODUCTS GMBH, Vienna (AT)

(72) Inventors: Josef Inschlag, Str. Lorenz am Wechsel (AT); Marcus Eder, Vienna (AT)

(73) Assignee: OTTO BOCK HEALTHCARE PRODUCTS GMBH, Vienna (AT)

( * ) Notice: Subject to any disclaimer, the term of this patent is extended or adjusted under 35 U.S.C. 154(b) by 0 days.

(21) Appl. No.: 15/115,581

(22) PCT Filed: Jan. 29, 2015

(86) PCT No.: PCT/EP2015/000169
§ 371 (c)(1),
(2) Date: Jul. 29, 2016

(87) PCT Pub. No.: WO2015/113766
PCT Pub. Date: Aug. 6, 2015

(65) Prior Publication Data
US 2017/0170760 A1     Jun. 15, 2017

(30) Foreign Application Priority Data

Jan. 30, 2014   (DE) ................ 10 2014 001 184

(51) Int. Cl.
*H02P 1/54*     (2006.01)
*H02P 6/182*    (2016.01)
(Continued)

(52) U.S. Cl.
CPC ............. *H02P 6/182* (2013.01); *H02P 6/08* (2013.01); *H02P 6/20* (2013.01)

(58) Field of Classification Search
CPC ............ H02P 6/10; H02P 6/08; G01R 19/002
See application file for complete search history.

(56) References Cited

U.S. PATENT DOCUMENTS 5,751,125 A   5/1998  Weiss
6,249,094 B1  6/2001  Zeh et al.
(Continued)

FOREIGN PATENT DOCUMENTS

DE   19645998 A1   5/1997
DE   19846831 A1   4/2000
(Continued)

OTHER PUBLICATIONS

PCT International Search Report for PCT International Patent Application No. PCT/EP2015/000169, dated Apr. 22, 2015.

*Primary Examiner* — Karen Masih
(74) *Attorney, Agent, or Firm* — Holland & Hart (57) ABSTRACT

A method for operating an electric motor when at a rotational speed below or above a predetermined limit value. The method involves operating an electric motor that has a stator and a rotor, wherein the stator or the rotor has at least three segments each having at least one electromagnetic element. The method includes simultaneously de-energizing all electromagnetic elements of all segments while the rotor rotates, measuring an electrical quantity induced in the electromagnetic elements, in particular an induced voltage, for each segment, and determining a rotor position of the rotor in relation to the stator from the measured electrical quantities. An electrical current can be supplied to the electromagnetic elements such that a segment magnetic field is formed to provide a segment torque to the rotor. The intensity of the electrical current depends on a segment position of the rotor in relation to the segment.

20 Claims, 8 Drawing Sheets

(51) Int. Cl.
*H02P 6/20* (2016.01)
*H02P 6/08* (2016.01)

(56) References Cited

U.S. PATENT DOCUMENTS

2007/0154192 A1    7/2007   Schneider et al.
2014/0152222 A1    6/2014   Mueller et al.
2016/0344244 A1*   11/2016   Li ............................ H02K 1/14

FOREIGN PATENT DOCUMENTS

| DE | 102004038415 A1 | 3/2006 |
| DE | 102008059052 A1 | 5/2010 |
| EP | 2037567 A2 | 3/2009 |
| WO | 2013004311 A1 | 1/2013 |

* cited by examiner

METHOD FOR OPERATING AN ELECTRIC MOTOR

TECHNICAL FIELD

The invention relates to a method for operating an electric motor.

BACKGROUND

Such electric motors have been known for a long time from the prior art and they are used in very different fields and with very different dimensions. By way of example, electric motors are used to drive streetcars or subways, but also to drive e.g. an artificial heart or a prosthesis.

Here, the functional principle is always the same. In one embodiment of such an electric motor, the stator, i.e. the stationary component, has at least three segments which each have an electromagnet. A current can be applied to these electromagnets separately from one another such that different magnetic fields with different orientations and strengths can be generated in the three segments. Here, the stator has, for example, a round embodiment with a central opening. Situated therein is the rotor, which is present e.g. in the form of a permanent magnet. If an electric current is now applied to some of the electromagnetic elements, the magnetic field is generated, said magnetic field interacting with a magnetic field of the rotor and transferring a torque to the rotor such that the latter starts to rotate. Here, the magnitude and the direction of the torque depend on the directions of the magnetic field lines in the mutually interacting magnetic fields. What can be achieved by skillful switching of the currents which flow through the various electromagnets of the stator is that a torque always acts on the rotor in one direction such that the rotor of the electric motor is kept in motion. Naturally, it is also possible to arrange the rotor outside of the stator or to provide the rotor with electromagnets. It is also possible to embody rotor and stator in the form of electromagnets.

In order to be able to operate such an electric motor in the most ideal manner, it is necessary to ensure that the torque applied to the rotor by the interaction of the various magnetic fields is as large as possible. In order to be able to ensure this, it is necessary to know the position of the rotor relative to the stator in order to know and to be able to exploit the angle relationships between the interacting magnetic fields in the best possible way.

Therefore, DE 196 45 998 A1, for example, has disclosed an artificial heart arrangement with an electric motor, in which, when the electric motor stands still, the position of the rotor relative to the stator can be established. To this end, an electric current is applied to the different segments and the electromagnetic elements situated therein and the inductances are subsequently measured. From this, it is possible to draw conclusions about the orientation of the rotor relative to the stator.

If the electric motor is operated with a constant rotational speed or rate of rotation, knowledge about this rate of rotation and the one-time determination of the position of the rotor relative to the stator are sufficient to ensure an ideal operation of the electric motor. However, particularly in the case where the rotational speed or the rate of rotation are not constant, for example because the electric motor is currently being started up or the rate of rotation depends on the load, an ideal operation of the electric motor is not possible from a one-time determination of the position of the rotor relative to the stator. In this case, the respective position of the rotor needs to be determined during operation as well.

The prior art has disclosed electric motors which achieve this by way of special sensors, e.g. Hall sensors. A disadvantage thereof is that the number of components for such an electric motor greatly increases as a result thereof and, moreover, each one of the sensors requires dedicated cabling and a dedicated power supply such that the production outlay for such electric motors greatly increases.

The prior art has disclosed sensor-less electric motors, in which the position of the rotor can be determined without additional sensors. Here, the electric motor is operated in such a way that at least one of the segments is always operated in a de-energized manner. This means that current only flows through the respective other electromagnets and so only these can build up a magnetic field which transfers a torque to the rotor. The electromagnetic element in the respective third segment is used as a sensor or measurement instrument, with a measurement relating to how large an induced electric voltage is being carried out in this element. Here, the segment operated in a de-energized manner is the segment in which this induced electric variable has a zero crossing. By determining this zero crossing, it is possible, at least theoretically, to determine the position and the time at which this position was assumed. Disadvantages of this method include, firstly, that at least one of the segments cannot transfer a torque onto the rotor in each case and, secondly, that the determination of a zero crossing can be afflicted by significant measurement errors, particularly in the case of a slow rate of rotation.

DE 10 2008 059 052 A1 and DE 198 46 831 A1 have disclosed methods by means of which the rotor position of an electric motor is determinable without a separate sensor.

SUMMARY

The invention is therefore based on the object of proposing a method for operating an electric motor which, during operation of the electric motor, reliably and confidently permits the position of the rotor to be determined relative to the stator, even in the case of a low rate of rotation, without additional sensors needing to be present therefor.

The invention achieves the addressed object by means of a method for operating, preferably for increasing a rate of rotation of a electric motor, in which a first method is applied in the case of a rate of rotation below a predetermined threshold and a second method is applied in the case of a rate of rotation above the predetermined threshold. Here, the first method is a method for operating an electric motor which has a stator and a rotor, wherein the stator or the rotor has at least three segments with in each case at least one electromagnetic element, wherein the first method comprises the following steps:

a) simultaneously de-energizing all electromagnetic elements of all segments while the rotor rotates, b) measuring an electric variable which is induced in the electromagnetic elements, in particular an induced electric voltage for each segment, c) determining a rotor position of the rotor relative to the stator from the measured electric variables.

Consequently, the first method is applied while the rotor of the electric motor rotates. Below, the method will be described for an electric motor, in which the electromagnetic elements of the segments are situated on the stator of the electric motor, wherein the stator has a central opening, in which the rotor rotates, said rotor comprising a permanent magnet. The method can also be carried out analogously for all other embodiments of electric motors.

The electromagnetic elements of all segments are de-energized at a certain time such that the magnetic field built up by this previously available current collapses and no torque can be transferred to the rotor anymore. However, the rotor continues to move due to inertia such that, in the embodiment assumed here in an exemplary manner, the magnetic field of the permanent magnet of the rotor continues to be turned. Now, the de-energized coils of the electromagnetic elements in the segments of the stator are situated in this magnetic field which continues to move.

Consequently, these coils are situated in a time-varying magnetic field of the rotor, and so there is an induction of an electric voltage in this case. This electric variable is measured in method step b). The magnitude and direction of this electric variable depend on the orientation of the electromagnetic elements, and in particular of the coil thereof, relative to the magnetic field of the rotor which continues to move. In the case where the segments are situated on the rotor, the now de-energized coils of the electromagnetic elements of the rotor move past e.g. permanent-magnetic elements of the stator. Consequently, there is a movement of a magnetic field relative to de-energized coils of a electromagnetic elements and the induction caused thereby, independently of the specific embodiment of the electric motor.

From the electric variables measured thus it is consequently possible to determine the rotor position of the rotor relative to the stator for a given time.

After the electric variables were measured, the appropriate current is advantageously applied to the electromagnetic elements such that a torque can be transferred onto the rotor and the electric motor can continue to be driven.

Preferably, the induced electric variable is measured following a time duration $t_{wait}$ after de-energizing, wherein the time duration $t_{wait}$ is preferably 50 µs. What is achieved thereby is that the electric current, which was applied to the electromagnetic elements before the latter were de-energized, has in fact decayed and can no longer falsify the measurement result. A time duration $t_{wait}$ of 50 µs was found to be sufficient in this case. Naturally, time durations of 60 µs, 70 µs or 100 µs are also conceivable.

In an advantageous embodiment of the method, the electromagnetic elements are de-energized for a switch-off duration $t_{switch-off}$ which is advantageously 100 µs. In the case of this variable, it is possible to wait the time duration $t_{wait}$ of approximately 50 µs and subsequently undertake the measurement of the electric variables for a further 50 µs. This means that, firstly, the electric current, which was applied to the electromagnetic elements prior to de-energizing, has decayed such that in fact only the electric current induced by the rotation of the rotor is measured and that, at the same time, electric current is not applied to the electromagnetic elements for such a short period of time that this does not lead to a drop in power of the electric motor.

Preferably, method steps a) to c) are carried out a number of times at different times such that a rotational speed and/or a number of revolutions of the rotor is/are determined from the rotor positions determined at different times. By way of example, 500 µs lie between two instances of de-energization of the electromagnetic elements. As a result, it is also possible to react to a fast change of the rotational speed of the rotor. Since this allows a rotor position of the rotor to be determined relative to the stator at different times, it is easily possible to determine a rotational speed herefrom and to determine a number of revolutions of the rotor therefrom. This precise knowledge of the rotational speed and/or number of revolutions of the rotor also renders it possible to obtain the ideal time for changing the electric currents in the electromagnetic elements, for example by sinusoidal commutation or block commutation, even in the case of changing numbers of revolutions. As a result, the effectiveness of the electric motor is increased and hence the amount of energy required for a specific task is reduced.

Unlike in methods from the prior art, it is no longer necessary in the method according to the invention to determine a zero crossing which, particularly in the case of low rates of rotation, is only determinable very imprecisely. Instead, electric voltages and/or electric currents are measured in the present case. Moreover, it is not necessary to determine the rotor position of the rotor from only one measurement of a single variable in a single sector. Rather, the position is determined from at least three measurement variables, namely the electric variable respectively measured in each segment. The rates of rotation at which this method can be carried out are approximately 1000 r.p.m. or less. The method can also be carried out at faster rates of rotation, provided the electric variables can be measured quickly enough and the measurement values can be evaluated. It may be necessary to adapt the switch-off time $t_{switch-off}$ and/or the duration $t_{wait}$. It is also possible to adapt the repetition rate with which the method is carried out.

However, possibly bothersome noise may develop at relatively high rates of rotation as a result of the brief switching off and on again of the power supply for the electromagnetic elements.

Particularly in the case where the switch-off time $t_{switch-off}$ is selected to be significantly greater than 100 µs or in the case where the induced electric variables can be measured particularly quickly, it is even possible to determine the induced electric variables twice within a single de-energization state of the electromagnetic elements and therefore determine not only the rotor position of the rotor relative to the stator but also the rotational speed and the number of revolutions of the electric motor by means of a single de-energization state.

According to the invention, the second method is a method for operating an electric motor which has a stator and a rotor, wherein the stator or the rotor has at least three segments with in each case at least one electromagnetic element, to which an electric current can be applied in such a manner that a segment magnetic field is formed, by means of which a segment torque is exerted on the rotor, the strength of which segment torque depends on a segment position of the rotor relative to the segment, wherein the method comprises the following steps:
  A) determining an expectation time at which the segment torque of a zero-crossing segment, which is one of the at least three segments, is expected to equal zero,
  B) de-energizing all electromagnetic elements of the zero-crossing segment for a first measurement time interval and for a second measurement time interval, wherein the first measurement time interval lies prior to the expectation time and the second measurement time interval is after the expectation time,
  C) measuring an electric variable which is induced in the electromagnetic elements of the zero-crossing segment, in particular an induced electric voltage, within the first measurement time interval and within the second measurement time interval,
  D) determining an actual time, at which the segment torque of the zero-crossing segment was equal to zero, from the measured electric variables.

In this second method, a current is also applied to all electromagnetic elements of all segments such that the segment magnetic fields can be formed and transfer a torque onto the rotor. As already presented, the magnitude and direction of each segment torque are dependent on the orientation of the electromagnetic element of the respective segment relative to the respective other magnetic field. In the embodiment described here in an exemplary manner, the segment torque consequently depends on the orientation of the rotor relative to the electromagnetic element of the respective segment of the stator.

In the method described here, an expectation time is initially determined, at which the torque to be transferred assumes a value of zero for a zero-crossing segment. This is the case for each segment at specific times, and so, in principle, each segment can be selected as a zero-crossing segment. Such an expectation time can be established from previously determined rotor positions and rotational speeds. In the present case, an expectation time is also understood to mean a time interval within which the zero crossing is expected. The electromagnetic elements of the zero-crossing segment are now de-energized for two measurement time intervals, wherein the first measurement time interval lies temporally before the expectation time and the second measurement time interval lies temporally after the expectation time. The electric variable induced into the electromagnetic elements of the zero-crossing segment, which are now de-energized, is measured at least once in each case within these measurement time intervals.

Since the expectation time, at which the torque has a zero crossing, lies between these two measurements, it is expected that the induced electric variable also has a sign change between the first measurement time interval and the second measurement time interval. The two measurement values, which are recorded in the respective measurement time intervals, consequently likewise differ in terms of sign. Now, it is possible to determine a real actual time from these two measurement values, at which the zero crossing actually took place. Since the zero crossing is characteristic for a very special orientation of the rotor relative to the stator for this segment, this renders it possible to reliably determine at which time—namely at the actual time—the rotor had this specific orientation relative to the stator.

Compared to the previous method, this method is advantageous in that fewer measurement values need to be recorded, and so it is also suitable for higher rates of rotation, which may, for example, lie in the range from 2000 to 3000 r.p.m. Moreover, only the at least one electromagnetic element of only a single segment, namely the zero-crossing segment, is de-energized in each case, and so the electromagnetic elements of the remaining segments can be continuously used to transfer a torque onto the rotor.

In an advantageous embodiment, the actual time is determined by linear interpolation of the measured electric variables. As a result of the rotation of the rotor, it is known that the induced electric variables correspond to a sinusoidal profile of the angle to be determined in a suitable manner. It is known that the sine of an angle can be approximated linearly for angles which are small in terms of magnitude thereof. Consequently, what can be achieved here if the measurement time intervals are set to follow one another so closely in time that the rotor at one instant has a small positive angle and at another instant has a small negative angle relative to the stator is that a linear interpolation is possible between the two measurement values, which are recorded in the various measurement time intervals, in order to determine the zero crossing and hence the actual time.

Preferably, steps A) to D) are carried out a number of times at different times and a rotational speed and/or a number of revolutions of the rotor is/are determined from the actual times determined in the process. Here, it is not necessary for the zero-crossing segment to be the identical segment for each time method steps A) to D) are carried out. Rather, any zero-crossing segment can be used for measurement since the spatial relationship between the individual segments is known.

It was found to be advantageous if a further expectation time is calculated from an actual time and the rotational speed and/or the number of revolutions. In this manner, it is possible to compensate and correct a deviation of the employed expectation time from the subsequently calculated real actual time such that, in subsequent measurements, the actual time, at which the zero crossing in fact takes place, is as close as possible to the expectation time. What can be achieved hereby is that there can also be, to a good approximation, a linear interpolation between the two measurement values recorded within the two measurement intervals.

Preferably, the first measurement time interval and the second measurement time interval are selected in such a way that the rotor deviates by less than 15°, preferably by less than 10° from the rotor position at the expectation time when measuring the electric variables. What this ensures is that the measurement values following the sinusoidal profile lie in the region in which the sine can be approximated by a linear function. If the measurement time intervals lie further apart in time, the rotor has moved forward by more than the aforementioned angles in the time between the two measurement time intervals, and so a linear interpolation between the two measurement values may lead to erroneous results, in particular for the case where the actual time does not coincide with the expectation time. In this case, other methods of interpolation need to be selected.

Consequently, the invention achieves the object addressed by a method for increasing a rate of rotation of an electric motor, in which the methods described here are combined. If the rate of rotation of the electric motor lies below a predetermined threshold, which can be e.g. 1300 r.p.m., 1500 r.p.m. or 1700 r.p.m., one of the methods described here is used, in which all electromagnetic elements of all segments are de-energized simultaneously. By contrast, if the rate of rotation of the electric motor increases and exceeds the predetermined threshold, the method for operating the electric motor is likewise changed and a method as per the second embodiment, in which the electromagnetic elements of only one of the segments, namely of the zero-crossing segment, are de-energized, is used in place of the previous method. In this way, ideal operation can always be ensured, even in the case of an increasing or varying number of rotations of the electric motor.

Even in the methods in which the electromagnetic elements of only one segment are de-energized, it was found to be advantageous to let the time duration $t_{wait}$ pass between de-energizing the respective electromagnetic elements and measuring the induced electric variable in order to let the previously present electric current, which was applied to the respective electromagnetic elements, decay. The time durations here correspond to the time durations already described for the first method since, in principle, the same measurements need to be carried out. The switch-off duration $t_{switch-off}$ for which the respective electromagnetic elements are de-energized, likewise in this case corresponds to the already described switch-off duration $t_{switch-off}$, and so it advantageously is 100 μs.

Consequently, by way of the methods described here, it is possible to easily and quickly determine the respective rotor position relative to the stator of the electric motor, without this requiring additional sensors. If the respective position of the rotor is known, the motor voltage used for the operation of the electric motor can be applied to the motor in an ideal manner. In particular, this advantageously happens in such a way that, over the three phases, the motor voltage is applied to the three segments in such a way that the field generated by the coils situated within the electromagnetic elements leads the field of the rotor by 90° such that a maximum torque is generated. Here, the different measurements of the respective rotor position of the rotor relative to the stator are advantageously carried out at intervals of 60°, and so the respective method is carried out six times during a complete revolution of the rotor.

BRIEF DESCRIPTION OF THE DRAWINGS

An exemplary embodiment of the present invention is explained in more detail below with the aid of the following drawings. In detail.

DETAILED DESCRIPTION

Figure 1:
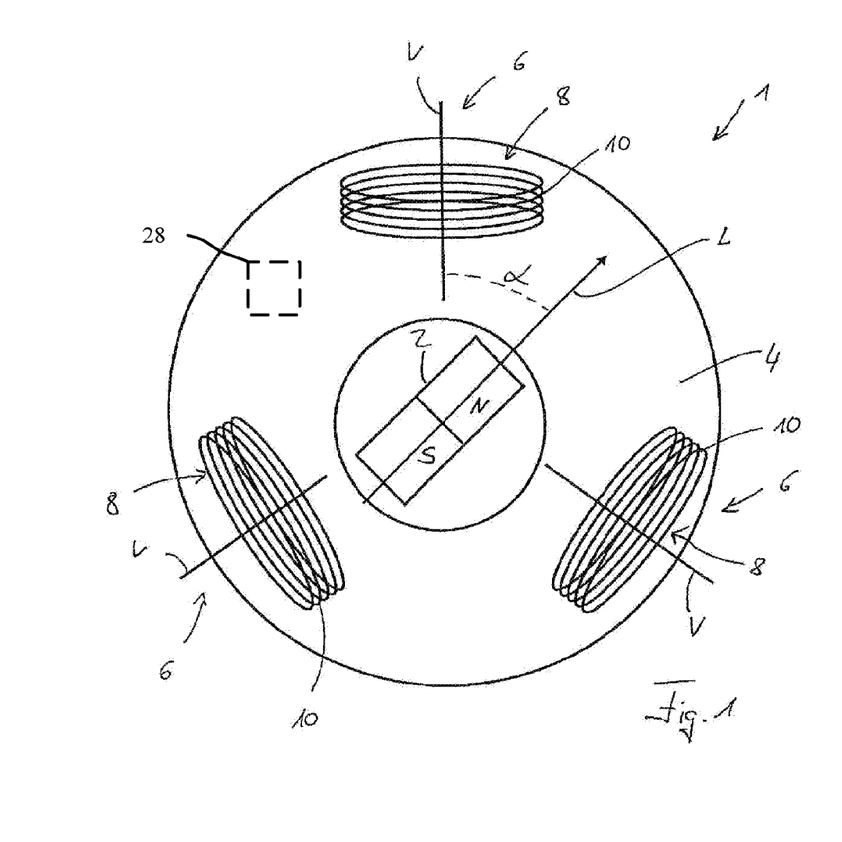
FIG. 1 shows the schematic representation of an electric motor.

FIG. 1 shows an electric motor 1, which comprises a rotor 2 and a stator 4 which surrounds the rotor 2. In the exemplary embodiment shown in FIG. 1, the rotor 2 substantially consists of a permanent magnet with a north and south pole, which has a direction of the extent L.

In the shown exemplary embodiment, the stator 4 is subdivided into three segments 6, which are arranged relative to one another at an angle of 120° and each comprise an electromagnetic element 8, which is illustrated as a schematically depicted coil 10. As is known in principle from the prior art, an electric current flows through the coils 10, said current being e.g. applied in a sine-commutated fashion. Consequently, the currents are variable in time such that the magnetic field which is built up by the coils on account of the currents likewise changes over time. The individual magnetic fields of the electromagnetic elements 8 interact with the magnetic field of the rotor 2 and thus transfer a torque. In order in this case to be able to achieve an ideal actuation, which consists, for example, in the magnetic field generated by the coils 10 leading the field of the rotor 2 by 90°, the position of the rotor 2 relative to the stator 4 must be known as exactly as possible.

In the methods in accordance with exemplary embodiments of the present invention, an electric current flows through all electromagnetic elements 8, or the coils 10 thereof, of all segments 6 such that magnetic fields are built up in the coils 10.

What is common to the methods described here is that one or more coils 10 are separated from the power supply for a brief period of time by operation of controls 28, which control energizing and de-energizing the electromagnetic elements 8 and coils 10, such that the magnetic field generated by the respective coil 10 collapses. Since this only occurs for a short switch-off duration $t_{switch-off}$ for all segments 6 simultaneously, or only for one segment 6, there is no, or no significant, impairment of the movement of the rotor 2. Consequently, the rotor 2 continues to rotate such that the magnetic field thereof rotates with the rotor 2. The coils 10, through which a current now does not flow, are consequently situated in a time-varying magnetic field, and so there is an induction of an electric variable, e.g. an electric current or an electric voltage. In this case, the magnitude and direction of this induced electric variable depends on the angle of the direction of extent L and the respective preferred direction V of the respective coils 10. The magnitude of this induced electric variable is e.g. plotted against the rotation angle in FIG. 2. In the exemplary embodiment shown in FIG. 1, the segment 6 arranged at the top is referred to as first segment and the individual segments 6 are subsequently numbered continuously in a clockwise direction. Consequently, the coil 10 depicted bottom right in FIG. 1 belongs to the second segment, while the coil 10 depicted bottom left in FIG. 1 belongs to the third segment.

Figure 2:
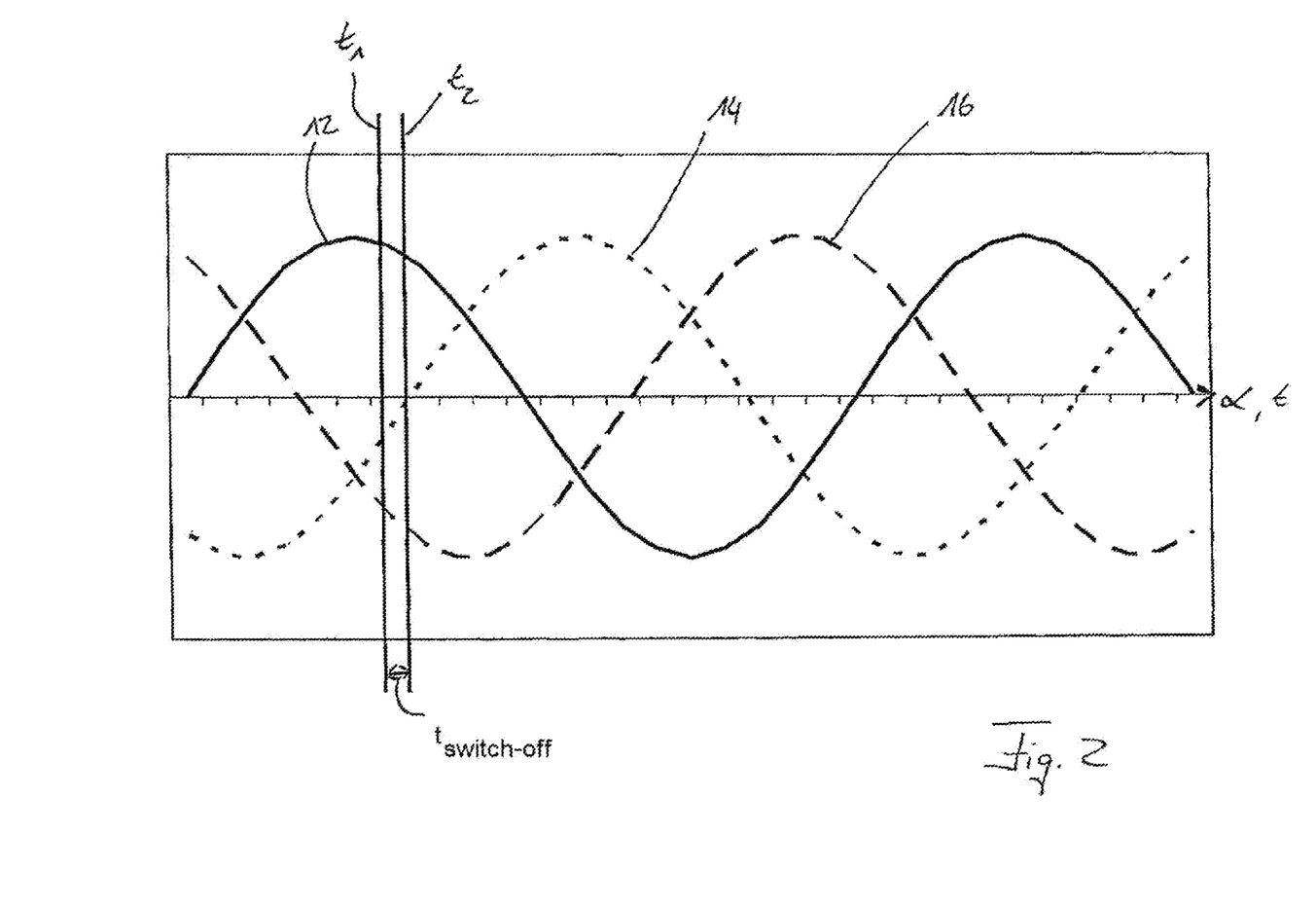
FIG. 2 shows the schematic representation of induced electric variables in accordance with a first exemplary embodiment of the present invention.

FIG. 2 schematically shows the induced electric variable, which may be e.g. the electric current or the electric voltage, as a function of the angle α between the direction of extent L and the preferred direction V of the coil 10 of the first segment 6, which is depicted at the top in FIG. 1.

Here, the full line shows the first induced variable 12, which is induced in the coil 10 of the first segment, i.e. at the top in FIG. 1, by the rotating rotor. The line depicted in a dashed manner with the short dashes depicts the second induced variable 14, which is induced in the coil 10 of the second segment, i.e. bottom right in FIG. 1. The line with long dashes depicts the third induced variable 16, which is induced in the coil 10 of the third segment, i.e. bottom left in FIG. 1.

Along the X-axis, FIG. 2 not only plots the angle α, it also simultaneously depicts the time t. This means that for as long as the rotor 2 rotates with a constant angular speed and all coils 10 are de-energized, i.e. no electric current flows therethrough, the induced variables depicted in FIG. 2 are induced in the respective coils 10. Naturally, the current, which flows through the coils 10 of the electromagnetic element 8, is not switched off for such a long period of time in the case of a method in accordance with one exemplary embodiment of the present invention. Rather, the switch-off duration $t_{switch-off}$ is depicted in an exemplary manner at one position in FIG. 2. Consequently, all coils 10 of all electromagnetic elements 8 of all segments 6 are de-energized at the first time $t_1$. Current is applied back to the coils 10 of the electromagnetic elements 8 at the second time $t_2$. Now, the first induced variable 12, the second induced variable 14 and the third induced variable 16 are determined within this time interval $t_{switch-off}$. As a result of the induced variables 12, 14, 16 being able to be determined in all coils 10 of all segments 6 at the same time, this allows the position of the rotor 2 to be established unambiguously relative to the stator 4. If this happens in succession at different times, it is thus possible to determine the rotational speed or rate of rotation of the electric motor from the known time duration between two such measurements and the change in the position of the rotor 2.

Figure 3:
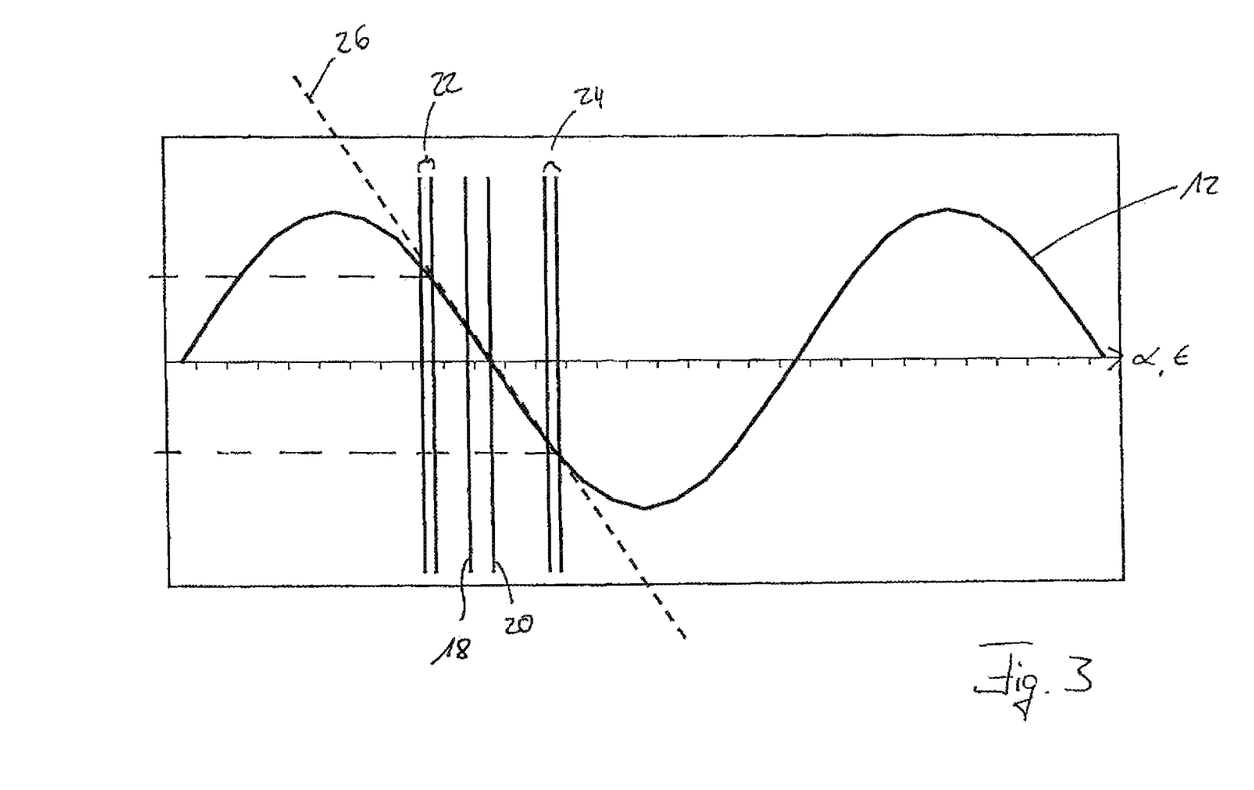
FIG. 3 shows the schematic representation of induced electric variables in accordance with a second exemplary embodiment of the present invention.

FIG. 3 shows the illustration from FIG. 1, with only the first induced variable 12 being depicted. A method in accordance with a further exemplary embodiment of the present invention is now explained on the basis of FIG. 3. At an expectation time 18, the expectation is that a torque is zero for a zero-crossing segment, which in this case the first segment 6. For a coil 10 of the first segment 6, i.e. at the top in FIG. 1, through which current flows, this only occurs if the angle α between the direction of extent L and the preferred direction V of the coil 10 of the first segment 6 is zero or 180°. Consequently, this corresponds precisely to the state in which the value of the first induced variable 12 is also zero in the case of a de-energized coil 10. In the FIG. 3, it is possible to identify that the expectation time 18 is slightly shifted in relation to a real actual time 20.

FIG. 3 moreover depicts a first measurement time interval 22 and a second measurement time interval 24, of which the first measurement time interval 22 lies before the expectation time 18 and the second measurement time interval 24 lies after the expectation time 18. The coil 10 of the electromagnetic element 8 of the first segment 6 is de-energized within these two measurement time intervals 22, 24 such that the induced electric variable can be measured. It can clearly be identified in FIG. 3 that the two measurement values, which are recorded within the first measurement time interval 22 and the second measurement time interval 24, have a different sign.

Since a temporal distance between the first measurement time interval 22 and the second measurement time interval 24 is selected to be so short that the angle α between these two measurement time intervals 22, 24 does not only change relatively insubstantially, a linear interpolation between these two measurement values is possible for establishing the actual time 20. The line of best fit 26 employed for this is depicted as a dashed line. Consequently, this renders it possible very easily but nevertheless exactly the actual time 20, at which the angle α between the preferred direction V of the coil 10 of the first segment 6 and the direction of extent L of the rotor 2 is zero or 180°. If this is carried out at different times, possibly also for different segments 6, this likewise allows the rotational speed and/or a number of revolutions to be determined in a particularly simple manner.

Figure 4:
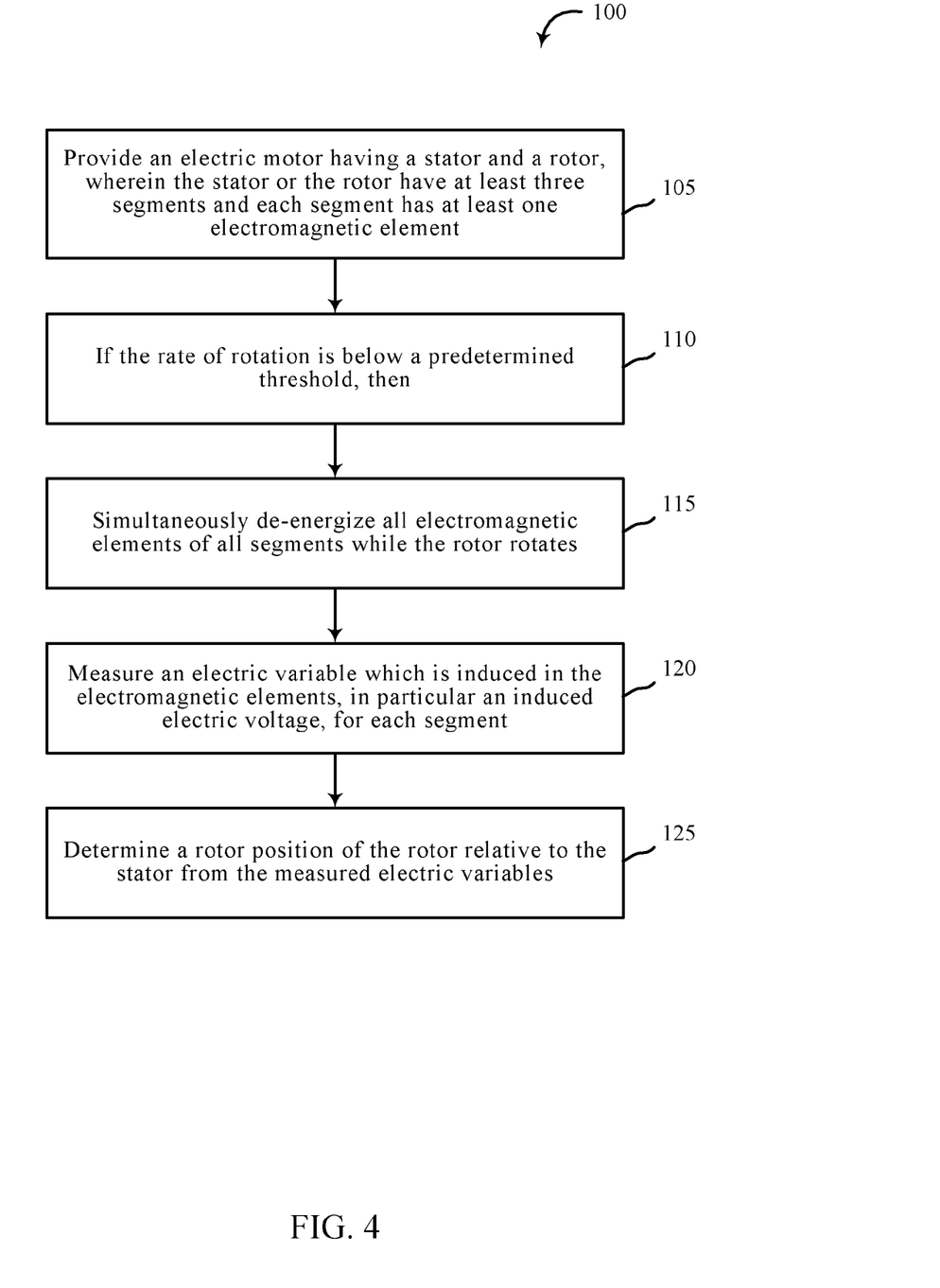
FIG. 4 shows a flow diagram of an example method of the present disclosure.

FIG. 4 is a flow diagram illustrating steps of an example method 100 related to the motor 1 shown in FIG. 1. The method 100 includes, at block 105, providing an electric motor having a stator and a rotor, wherein the stator or the rotor have at least three segments and each segment has at least one electromagnetic element. Block 110 includes simultaneously de-energizing all electromagnetic elements of all segments while the rotor rotates. Block 115 includes measuring an electric variable which is induced in the electromagnetic elements, in particular an induced electric voltage, for each segment. Block 120 includes determining a rotor position of the rotor relative to the stator from the measured electric variables.

Figure 5:
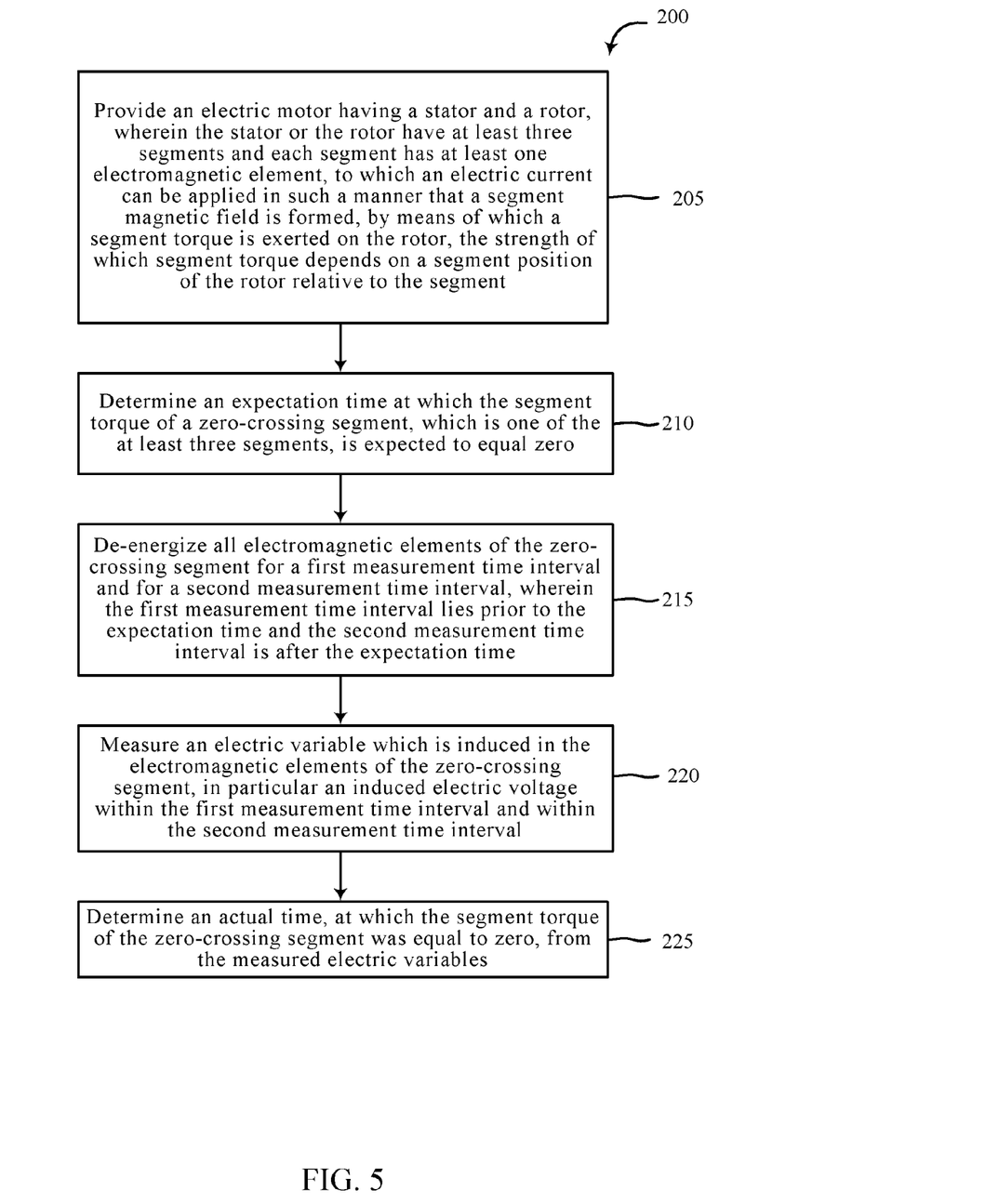
FIG. 5 shows a flow diagram of another example method of the present disclosure.

FIG. 5 is a flow diagram illustrating steps of an example method 200 related to the motor 1 shown in FIG. 1. The method 200 includes, at block 205, providing an electric motor having a stator and a rotor, wherein the stator or the rotor have at least three segments and each segment has at least one electromagnetic element, to which an electric current can be applied in such a manner that a segment magnetic field is formed, by means of which a segment torque is exerted on the rotor, the strength of which segment torque depends on a segment position of the rotor relative to the segment. Block 210 includes determining an expectation time at which the segment torque of a zero-crossing segment, which is one of the at least three segments, is expected to equal zero. Block 215 includes de-energizing all electromagnetic elements of the zero-crossing segment for a first measurement time interval and for a second measurement time interval, wherein the first measurement time interval lies prior to the expectation time and the second measurement time interval is after the expectation time. Block 220 includes measuring an electric variable which is induced in the electromagnetic elements of the zero-crossing segment, in particular as an induced electric voltage within the first measurement time interval and within the second measurement time interval. Block 225 includes determining an actual time, at which the segment torque of the zero-crossing segment was equal to zero, from the measured electric variables.

Figure 6:
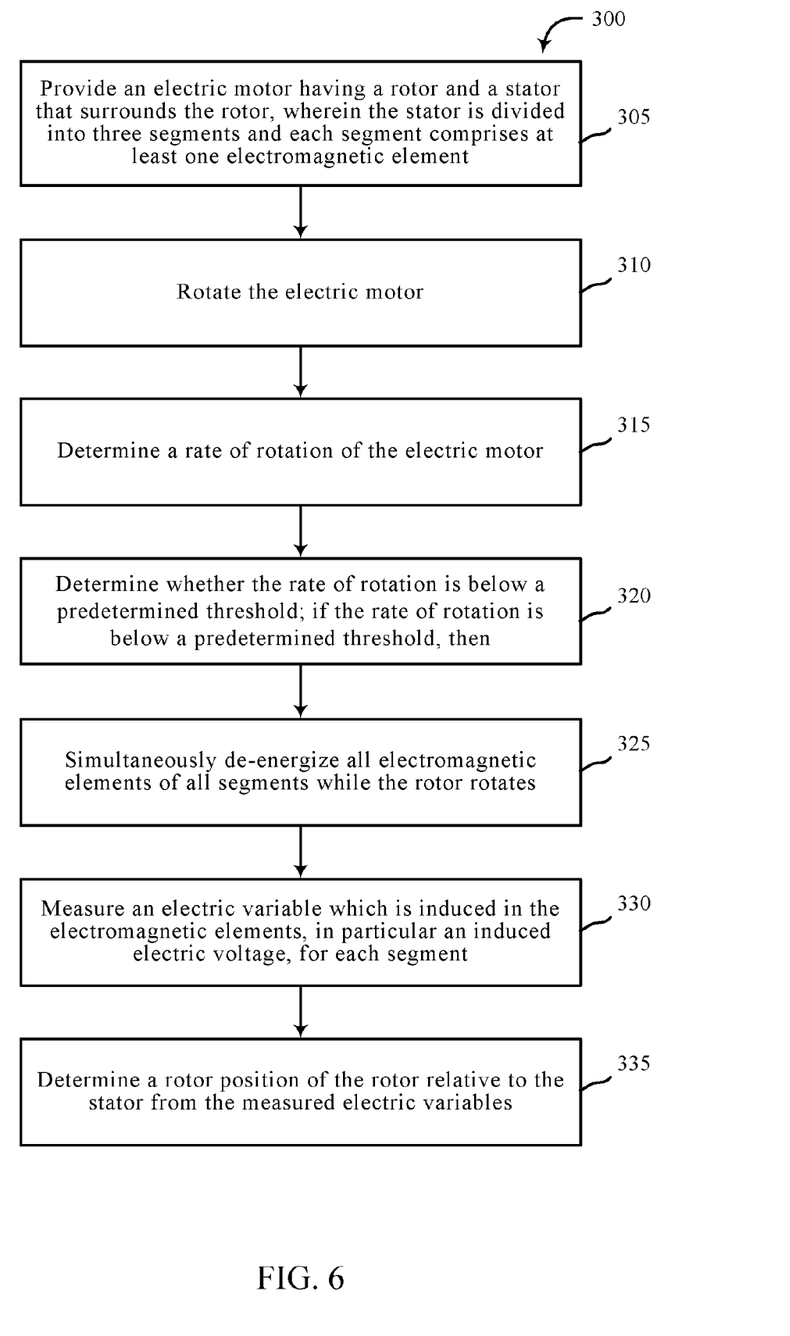
FIG. 6 shows a flow diagram of another example method of the present disclosure.

FIG. 6 is a flow diagram illustrating steps of an example method 300 related to the motor 1 shown in FIG. 1. Method 300, at block 305, includes providing an electric motor having a rotor and a stator that surrounds the rotor, wherein the stator is divided into three segments and each segment comprises at least one electromagnetic element. Block 310 includes rotating the electric motor. Block 315 includes determining a rate of rotation of the electric motor. Block 320 includes determining whether the rate of rotation is below a predetermined threshold, and if the rate of rotation is below a predetermined threshold, then performing the following steps. Block 325 includes simultaneously de-energizing all of the at least one electromagnetic elements of all of the at least three segments while the rotor rotates. Block 330 includes measuring a first electric variable induced in the at least one electromagnetic elements for each of the at least three segments. Block 335 includes determining a rotor position of the rotor relative to the stator from the measured electric variable.

Figure 7:
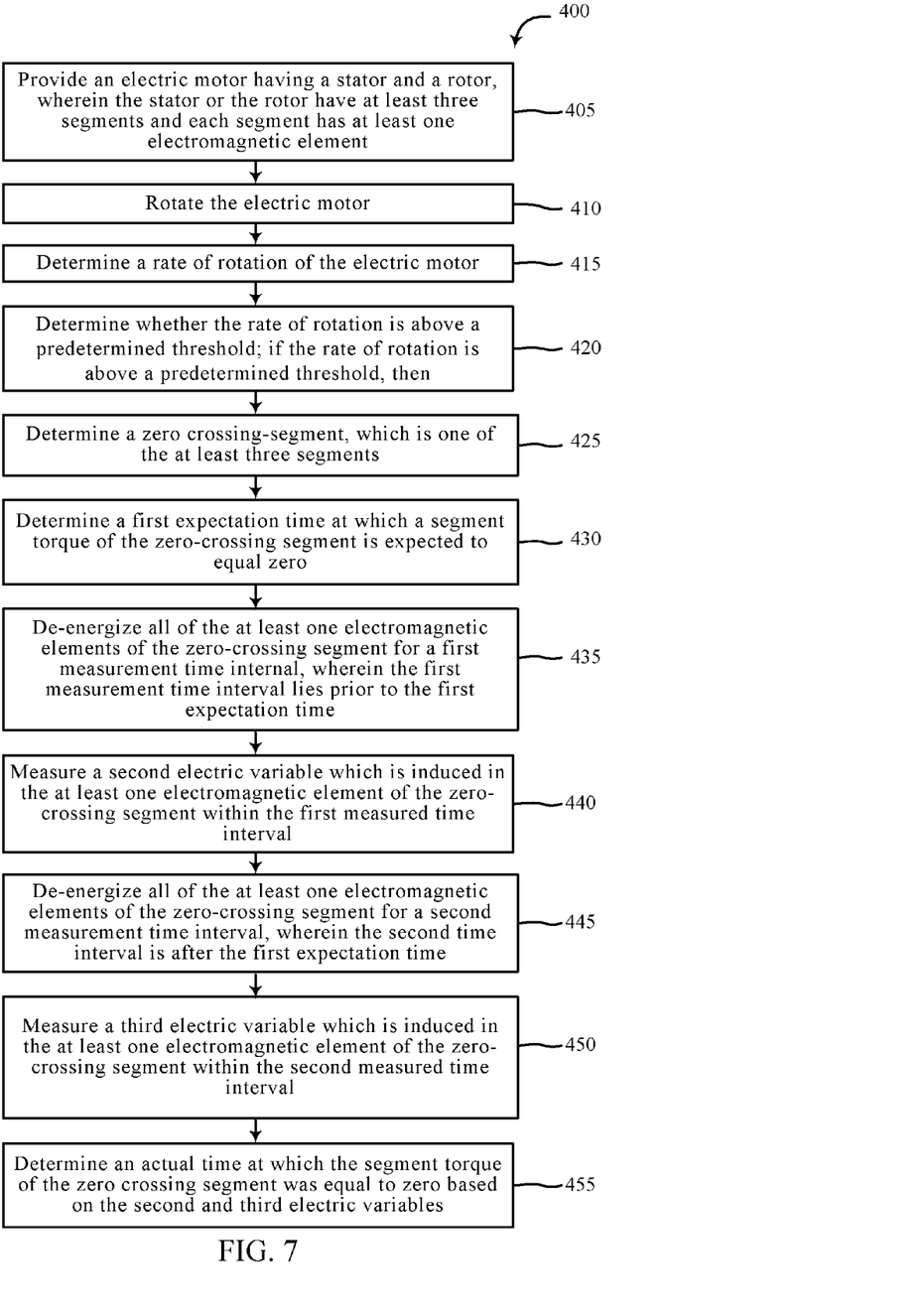
FIG. 7 shows a flow diagram of another example method of the present disclosure.

FIG. 7 is a flow diagram illustrating steps of an example method 400 related to the motor 1 shown in FIG. 1. Method 400, at block 405, includes providing an electric motor having a stator and a rotor, wherein the stator or the rotor have at least three segments and each segment has at least one electromagnetic element. Block 410 includes rotating the electric motor. Block 415 includes determining a rate of rotation of the electric motor. Block 420 includes determining whether the rate of rotation is above a predetermined threshold, and if the rate of rotation is above a predetermined threshold, then performing the following steps. Block 425 includes determining a zero crossing-segment, which is one of the at least three segments. Block 430 includes determining a first expectation time at which a segment torque of the zero-crossing segment is expected to equal zero. Block 435 includes de-energizing all of the at least one electromagnetic elements of the zero-crossing segment for a first measurement time internal, wherein the first measurement time interval lies prior to the first expectation time. Block 440 includes measuring a second electric variable which is induced in the at least one electromagnetic element of the zero-crossing segment within the first measured time interval. Block 445 includes de-energizing all of the at least one electromagnetic elements of the zero-crossing segment for a second measurement time interval, wherein the second time interval is after the first expectation time. Block 450 includes measuring a third electric variable which is induced in the at least one electromagnetic element of the zero-crossing segment within the second measured time interval. Block 455 includes determining an actual time at which the segment torque of the zero crossing segment was equal to zero based on the second and third electric variables.

Figure 8:
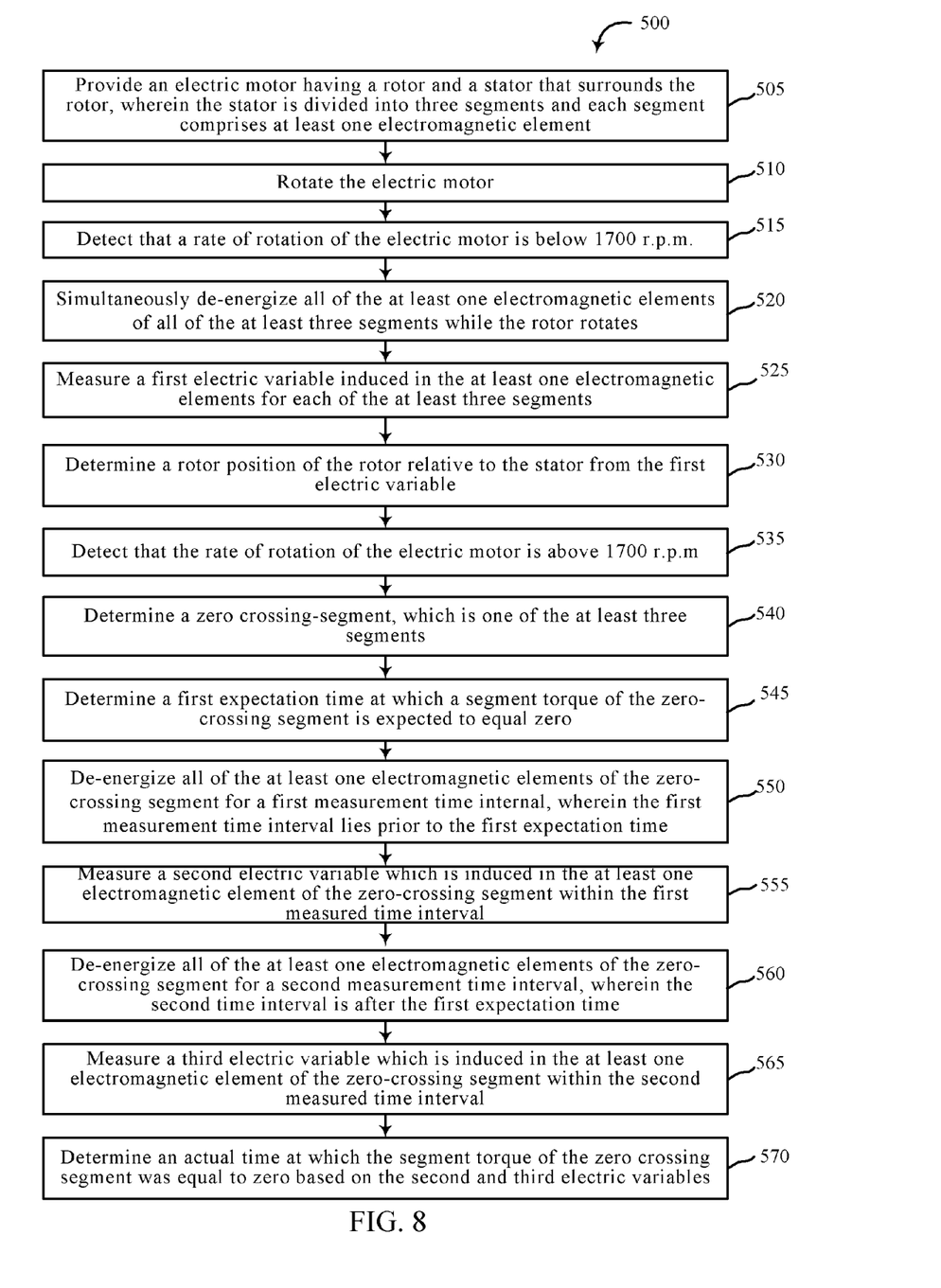
FIG. 8 shows a flow diagram of another example method of the present disclosure.

FIG. 8 is a flow diagram illustrating steps of an example method 500 related to the motor 1 shown in FIG. 1. Method 500 includes, at block 505, providing an electric motor having a rotor and a stator that surrounds the rotor, wherein the stator is divided into three segments and each segment comprises at least one electromagnetic element. Block 505 includes rotating the electric motor. Block 510 includes detecting that a rate of rotation of the electric motor is below 1700 r.p.m. Block 515 includes simultaneously de-energizing all of the at least one electromagnetic elements of all of the at least three segments while the rotor rotates. Block 520 includes measuring a first electric variable induced in the at least one electromagnetic elements for each of the at least three segments. Block 525 includes determining a rotor position of the rotor relative to the stator from the first electric variable. Block 530 includes detecting that the rate of rotation of the electric motor is above 1700 r.p.m. Block 535 includes determining a zero crossing-segment, which is one of the at least three segments. Block 540 includes determining a first expectation time at which a segment torque of the zero-crossing segment is expected to equal zero. Block 545 includes de-energizing all of the at least one electromagnetic elements of the zero-crossing segment for a first measurement time internal, wherein the first measurement time interval lies prior to the first expectation time. Block 550 includes measuring a second electric variable which is induced in the at least one electromagnetic element of the zero-crossing segment within the first measured time interval. Block 555 includes de-energizing all of the at least one electromagnetic elements of the zero-crossing segment for a second measurement time interval, wherein the second time interval is after the first expectation time. Block 560 includes measuring a third electric variable which is induced in the at least one electromagnetic element of the zero-crossing segment within the second measured time interval. Block 565 includes determining an actual time at which the segment torque of the zero crossing segment was equal to zero based on the second and third electric variables.

LIST OF REFERENCE SIGNS

L Direction of extent
$t_{switch-off}$ Switch off duration
V Preferred direction
α Angle
$t_1$ First time
$t_2$ Second time
1 Electric motor
2 Rotor
4 Stator
6 Segment
8 Electromagnetic element
10 Coil
12 First induced variable
14 Second induced variable
16 Third induced variable
18 Expectation time
20 Actual time
22 First measurement time interval
24 Second measurement time interval
26 Line of best fit

The invention claimed is:

1. A method for operating an electric motor, in which a first method is applied in the case of a rate of rotation below a predetermined threshold and a second method is applied in the case of a rate of rotation above the predetermined threshold, wherein the first method is a method for operating an electric motor which has a stator and a rotor, wherein the stator or the rotor has at least three segments with in each case at least one electromagnetic element, wherein the first method comprises the following steps:
   a) simultaneously de-energizing all electromagnetic elements of all segments while the rotor rotates,
   b) measuring an electric variable which is induced in the electromagnetic elements, in particular an induced electric voltage, for each segment,
   c) determining a rotor position of the rotor relative to the stator from the measured electric variables;
and wherein the second method is a method for operating an electric motor which has a stator and a rotor, wherein the stator or the rotor has at least three segments with in each case at least one electromagnetic element, to which an electric current can be applied in such a manner that a segment magnetic field is formed, by means of which a segment torque is exerted on the rotor, the strength of which segment torque depends on a segment position of the rotor relative to the segment, wherein the second method comprises the following steps:
   A) determining an expectation time at which the segment torque of a zero-crossing segment, which is one of the at least three segments, is expected to equal zero,
   B) de-energizing all electromagnetic elements of the zero-crossing segment for a first measurement time interval and for a second measurement time interval, wherein the first measurement time interval lies prior to the expectation time and the second measurement time interval is after the expectation time,
   C) measuring an electric variable which is induced in the electromagnetic elements of the zero-crossing segment as an induced electric voltage within the first measurement time interval and within the second measurement time interval,
   D) determining an actual time, at which the segment torque of the zero-crossing segment was equal to zero, from the measured electric variables.

2. The method as claimed in claim 1, wherein the method is a method for increasing a rate of rotation of the electric motor.

3. The method as claimed in claim 1, wherein in the first method, the induced electric variable is measured following a time duration $t_{wait}$ after de-energizing, wherein the time duration $t_{wait}$ is preferably 50 μs.

4. The method as claimed in claim 1, wherein in the first method, the electromagnetic elements are de-energized for a switch-off duration $t_{switch-off}$, which is preferably 100 μs.

5. The method as claimed in claim 1, wherein in the first method, steps a) to c) are carried out a number of times at different times and a rotational speed and/or a number of revolutions of the rotor is/are determined from the rotor positions determined at different times.

6. The method as claimed in claim 1, wherein in the second method, the actual time is determined by linear interpolation of the measured electric variables.

7. The method as claimed in claim 1, wherein in the second method, steps A) to D) are carried out a number of times at different times and a rotational speed and/or a number of revolutions of the rotor is/are determined from the actual times determined in the process.

8. The method as claimed in claim 7, wherein in the second method, a further expectation time is calculated from an actual time and the rotational speed and/or the number of revolutions.

9. The method as claimed in claim 1, wherein in the second method, the first measurement time interval and the second measurement time interval are selected in such a way that the rotor deviates by less than 15° from the rotor position at the expectation time when measuring the electric variables.

10. A method for operating an electric motor, the electric motor comprising a rotor and a stator that surrounds the rotor, wherein the stator is divided into at least three segments and each segment comprises at least one electromagnetic element; wherein the method comprises:
rotating the electric motor;
determining a rate of rotation of the electric motor;
determining whether the rate of rotation is below a predetermined threshold;
performing the following steps based at least in part on the determination of the rate of rotation being below;
simultaneously de-energizing all of the at least one electromagnetic elements of all of the at least three segments while the rotor rotates;
measuring a first electric variable induced in the at least one electromagnetic elements for each of the at least three segments;
determining a rotor position of the rotor relative to the stator from the measured electric variable;
determining whether the rate of rotation is above a predetermined threshold;
performing the following steps based at least in part on the determination of the rate of rotation being above;
determining a zero crossing-segment, which is one of the at least three segments;
determining a first expectation time at which a segment torque of the zero-crossing segment is expected to equal zero;
de-energizing all of the at least one electromagnetic elements of the zero-crossing segment for a first measurement time internal, wherein the first measurement time interval lies prior to the first expectation time;
measuring a second electric variable which is induced in the at least one electromagnetic element of the zero-crossing segment within the first measured time interval;
de-energizing all of the at least one electromagnetic elements of the zero-crossing segment for a second measurement time interval, wherein the second time interval is after the first expectation time;
measuring a third electric variable which is induced in the at least one electromagnetic element of the zero-crossing segment within the second measured time interval;
determining an actual time at which the segment torque of the zero crossing segment was equal to zero based on the second and third electric variables.

11. The method of claim 10, wherein measuring the first electric variable further includes:
determining an orientation of the at least one electromagnetic element relative to a magnetic field of the rotor;
deriving a magnitude and direction of the first electric variable based at least in part on the orientation of the at least one electromagnetic element.

12. The method of claim 10, wherein measuring the first electric variable is performed a predetermined time duration after the de-energizing.

13. The method of claim 10, further comprising:
repeating the steps of the first method;
calculating an ideal time to change an electric current to each of the at least one electromagnetic elements in the at least three segments.

14. The method of claim 10, further comprising:
determining a zero-crossing segment wherein a torque to be transferred to a segment assumes a value of zero.

15. The method of claim 10, further comprising:
calculating a second expectation time, the second expectation time calculated from the actual time and a rotational speed and/or a number of revolutions of the zero-crossing segment.

16. The method of claim 15, further comprising:
calculating a deviation of the first expectation time and the second expectation time;
determining a real expectation time;
repeating the steps of the second method using the real expectation time.

17. The method of claim 10, further comprising:
repeating the steps of the second method a number of times at different times;
determining a rotational speed and/or a number of revolutions of the rotor from the actual times determined in the repeated steps.

18. The method of claim 10, wherein in the second method, the first measurement time interval and the second measurement time interval are selected such that the rotor deviates by less than 15° from the rotor position at the expectation time when measuring the electric variables.

19. The method of claim 10, wherein the actual time is determined by linear interpolation of the measured electric variables.

20. A method of increasing a rate of rotation of an electric motor, the electric motor comprising a rotor and a stator that surrounds the rotor, wherein the stator is divided into at least three segments and each segment comprises at least one electromagnetic element; wherein the method comprises:
rotating the electric motor;
detecting that a rate of rotation of the electric motor is below 1700 r.p.m.;
simultaneously de-energizing all of the at least one electromagnetic elements of all of the at least three segments while the rotor rotates;
measuring a first electric variable induced in the at least one electromagnetic elements for each of the at least three segments;
determining a rotor position of the rotor relative to the stator from the first electric variable;
detecting that the rate of rotation of the electric motor is above 1700 r.p.m;
determining a zero crossing-segment, which is one of the at least three segments;
determining a first expectation time at which a segment torque of the zero-crossing segment is expected to equal zero;
de-energizing all of the at least one electromagnetic elements of the zero-crossing segment for a first measurement time internal, wherein the first measurement time interval lies prior to the first expectation time;
measuring a second electric variable which is induced in the at least one electromagnetic element of the zero-crossing segment within the first measured time interval;
de-energizing all of the at least one electromagnetic elements of the zero-crossing segment for a second measurement time interval, wherein the second time interval is after the first expectation time;

measuring a third electric variable which is induced in the at least one electromagnetic element of the zero-crossing segment within the second measured time interval;
determining an actual time at which the segment torque of the zero crossing segment was equal to zero based on the second and third electric variables.

\* \* \* \* \*